(12) United States Patent
Stegmaier et al.

(10) Patent No.: US 9,661,893 B2
(45) Date of Patent: May 30, 2017

(54) ARTICLE OF FOOTWEAR WITH AN INTERNAL AND EXTERNAL MIDSOLE STRUCTURE

(75) Inventors: Barbara Stegmaier, Portland, OR (US); Daniel A. Williamson, St. Paul, OR (US); David J. Dirsa, N. Andover, MA (US); Miaochang Zadnik, Hillsboro, OR (US); Fei Huang, Guang Zhou (CN); Pu He, Guang Zhou (CN)

(73) Assignee: NIKE, Inc., Beaverton, OR (US)

( * ) Notice: Subject to any disclaimer, the term of this patent is extended or adjusted under 35 U.S.C. 154(b) by 823 days.

(21) Appl. No.: 13/304,151

(22) Filed: Nov. 23, 2011

(65) Prior Publication Data

US 2013/0125421 A1   May 23, 2013

(51) Int. Cl.

| | |
|---|---|
| *A43B 13/00* | (2006.01) |
| *A43B 1/10* | (2006.01) |
| *A43B 5/00* | (2006.01) |
| *A43B 7/14* | (2006.01) |
| *A43B 13/18* | (2006.01) |
| *A43B 13/14* | (2006.01) |
| *A43B 21/06* | (2006.01) |
| *A43B 21/24* | (2006.01) |
| *A43B 21/26* | (2006.01) |
| *A43B 21/36* | (2006.01) |
| *A43B 1/00* | (2006.01) |
| *A43B 7/32* | (2006.01) |

(Continued)

(52) U.S. Cl.
CPC .............. *A43B 1/10* (2013.01); *A43B 1/0018* (2013.01); *A43B 7/144* (2013.01); *A43B 7/32* (2013.01); *A43B 13/026* (2013.01); *A43B 13/141* (2013.01); *A43B 13/146* (2013.01); *A43B 13/148* (2013.01); *A43B 13/185* (2013.01); *A43B 13/187* (2013.01); *B29D 35/122* (2013.01)

(58) Field of Classification Search
CPC ....... A43B 1/0018; A43B 7/32; A43B 13/141; A43B 13/182; A43B 13/187
USPC ...... 36/28, 31, 35 R, 36 A, 83, 88, 102, 103
See application file for complete search history.

(56) References Cited

U.S. PATENT DOCUMENTS

| | | | | |
|---|---|---|---|---|
| 4,183,156 | A * | 1/1980 | Rudy ................... | A43B 17/035 36/29 |
| 4,219,945 | A * | 9/1980 | Rudy ................... | A43B 13/206 36/29 |

(Continued)

*Primary Examiner* — Clinton T Ostrup
*Assistant Examiner* — Cameron A Carter
(74) *Attorney, Agent, or Firm* — Banner & Witcoff, Ltd.

(57) ABSTRACT

Articles of footwear having both interior and exterior midsole components may include: (a) an upper that at least in part defines an interior chamber; (b) an interior midsole component within the interior chamber, wherein, at a forefoot region, the interior midsole component includes a longitudinal flexion line and a plurality of transverse flexion lines; and (c) an exterior sole structure engaged with the upper. This exterior sole structure may include: (a) an exterior midsole component in a heel region of the article of footwear that does not extend under the forefoot region of the article of footwear and (b) an outsole component that extends under the forefoot region. If desired, the outsole component may extend under the exterior midsole component in the rearfoot region. The interior midsole component may include a plurality of pod elements separated from one another by the flexion lines.

16 Claims, 12 Drawing Sheets

(51) Int. Cl.
*A43B 13/02* (2006.01)
*B29D 35/12* (2010.01)

(56) References Cited

U.S. PATENT DOCUMENTS

| | | | | |
|---|---|---|---|---|
| 4,255,877 A * | 3/1981 | Bowerman | | A43B 23/17 36/128 |
| 4,287,675 A | 9/1981 | Norton et al. | | |
| 4,288,929 A | 9/1981 | Norton et al. | | |
| 4,354,318 A | 10/1982 | Frederick et al. | | |
| 4,364,188 A | 12/1982 | Turner et al. | | |
| 4,364,189 A * | 12/1982 | Bates | | A43B 5/06 36/129 |
| 5,014,449 A * | 5/1991 | Richard | | A43B 3/0084 36/114 |
| 5,247,742 A * | 9/1993 | Kilgore | | A43B 5/00 36/114 |
| 5,343,639 A * | 9/1994 | Kilgore | | A43B 13/183 36/27 |
| 5,353,523 A * | 10/1994 | Kilgore | | A43B 13/183 36/28 |
| 5,367,792 A * | 11/1994 | Richard | | A43B 3/0084 36/114 |
| 5,983,529 A * | 11/1999 | Serna | | A43B 1/0072 36/28 |
| 6,568,102 B1 * | 5/2003 | Healy | | A43B 13/187 36/27 |
| 6,898,870 B1 * | 5/2005 | Rohde | | A43B 7/1465 36/114 |
| 6,964,120 B2 * | 11/2005 | Cartier | | A43B 13/12 36/28 |
| 6,968,636 B2 * | 11/2005 | Aveni | | A43B 7/1465 36/114 |
| 7,314,125 B2 | 1/2008 | Smaldone et al. | | |
| 7,458,172 B2 * | 12/2008 | Aveni | | A43B 13/183 267/144 |
| 7,637,035 B1 * | 12/2009 | Gillespie | | A43B 3/24 36/102 |
| 7,730,635 B2 | 6/2010 | Aveni et al. | | |
| 7,757,410 B2 | 7/2010 | Aveni et al. | | |
| 7,793,428 B2 * | 9/2010 | Shenone | | A43B 1/0072 36/25 R |
| 7,941,938 B2 * | 5/2011 | Yu | | A43B 7/1415 36/25 R |
| 2004/0068891 A1 * | 4/2004 | Wang | | A43B 1/0018 36/27 |
| 2004/0128860 A1 * | 7/2004 | Smaldone | | A43B 1/0072 36/28 |
| 2004/0261292 A1 * | 12/2004 | Aveni | | A43B 7/1465 36/28 |
| 2006/0064900 A1 * | 3/2006 | Aveni | | A43B 13/183 36/28 |
| 2006/0112592 A1 * | 6/2006 | Leedy | | A43B 1/0081 36/29 |
| 2006/0137220 A1 * | 6/2006 | Hardy | | A43B 13/183 36/28 |
| 2006/0185191 A1 * | 8/2006 | Crowley | | A43B 13/181 36/28 |
| 2006/0191162 A1 * | 8/2006 | Aveni | | A43B 7/1495 36/28 |
| 2007/0033830 A1 * | 2/2007 | Chang | | A43B 3/0052 36/28 |
| 2007/0033831 A1 * | 2/2007 | Aveni | | A43B 1/0072 36/28 |
| 2007/0169376 A1 * | 7/2007 | Hatfield | | A43B 7/1415 36/29 |
| 2007/0199213 A1 * | 8/2007 | Campbell | | A43B 3/0057 36/102 |
| 2007/0209230 A1 * | 9/2007 | Dillon | | A43B 13/184 36/25 R |
| 2008/0016720 A1 * | 1/2008 | Aveni | | A43B 13/14 36/28 |
| 2008/0034615 A1 * | 2/2008 | Nishiwaki | | A43B 13/181 36/88 |
| 2008/0313928 A1 * | 12/2008 | Adams | | A43B 5/1633 36/103 |
| 2009/0100705 A1 * | 4/2009 | Cook | | A43B 13/026 36/29 |
| 2009/0100709 A1 * | 4/2009 | Macey | | A43B 13/187 36/88 |
| 2009/0113758 A1 * | 5/2009 | Nishiwaki | | A43B 13/10 36/88 |
| 2009/0217548 A1 * | 9/2009 | Leedy | | A43B 1/0081 36/28 |
| 2010/0140854 A1 * | 6/2010 | Aveni | | A43B 13/14 267/136 |
| 2010/0251566 A1 * | 10/2010 | Nakano | | A43B 13/181 36/28 |
| 2010/0263227 A1 * | 10/2010 | Aveni | | A43B 13/181 36/28 |
| 2011/0005099 A1 * | 1/2011 | Aveni | | A43B 13/181 36/28 |
| 2011/0005100 A1 * | 1/2011 | Smaldone | | A43B 13/183 36/28 |
| 2011/0010964 A1 * | 1/2011 | Hardy | | A43B 13/36 36/103 |
| 2011/0214313 A1 * | 9/2011 | James | | A43B 13/141 36/103 |
| 2011/0219553 A1 * | 9/2011 | Macey | | A43B 13/181 12/142 P |
| 2013/0000159 A1 * | 1/2013 | Hatfield | | A43B 3/0057 36/59 C |
| 2013/0104423 A1 * | 5/2013 | Hatfield | | A43B 5/001 36/103 |
| 2015/0089841 A1 * | 4/2015 | Smaldone | | A43B 5/00 36/103 |

* cited by examiner

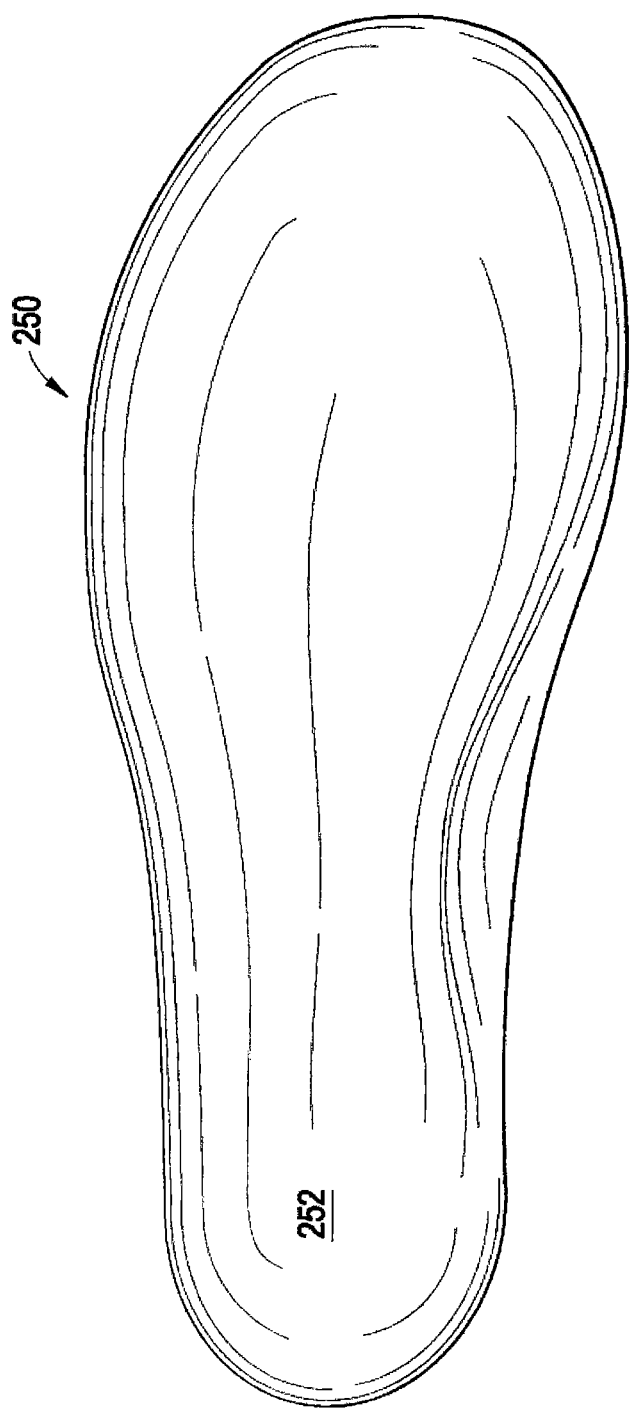

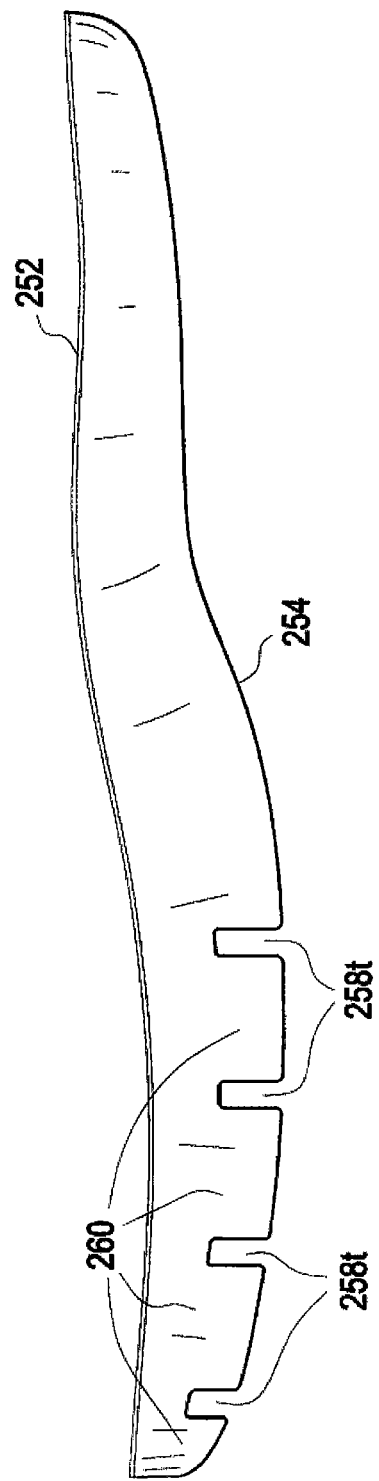

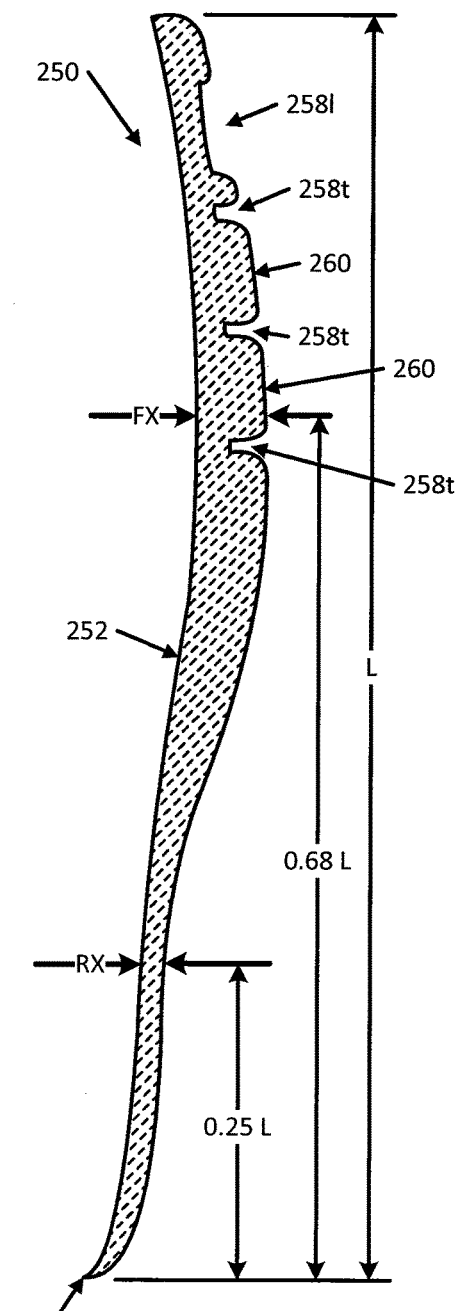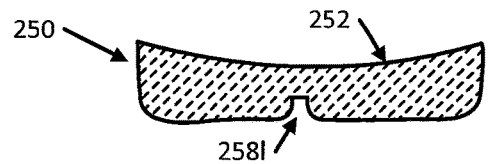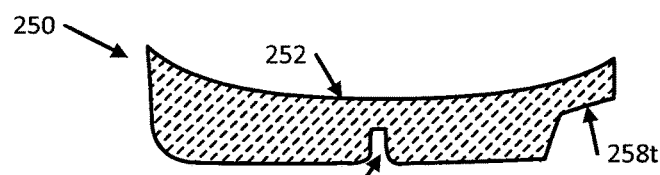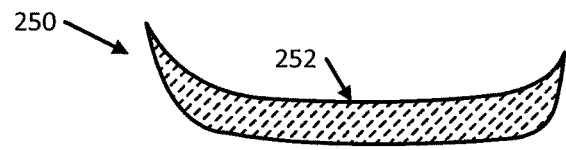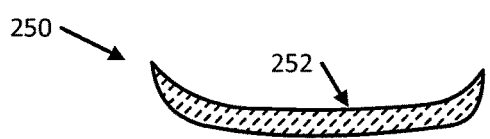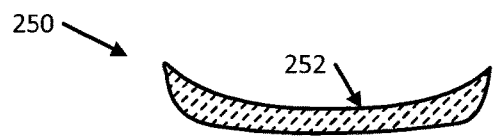
FIG. 2H
FIG. 2I
FIG. 2J
FIG. 2K
FIG. 2L
FIG. 2M

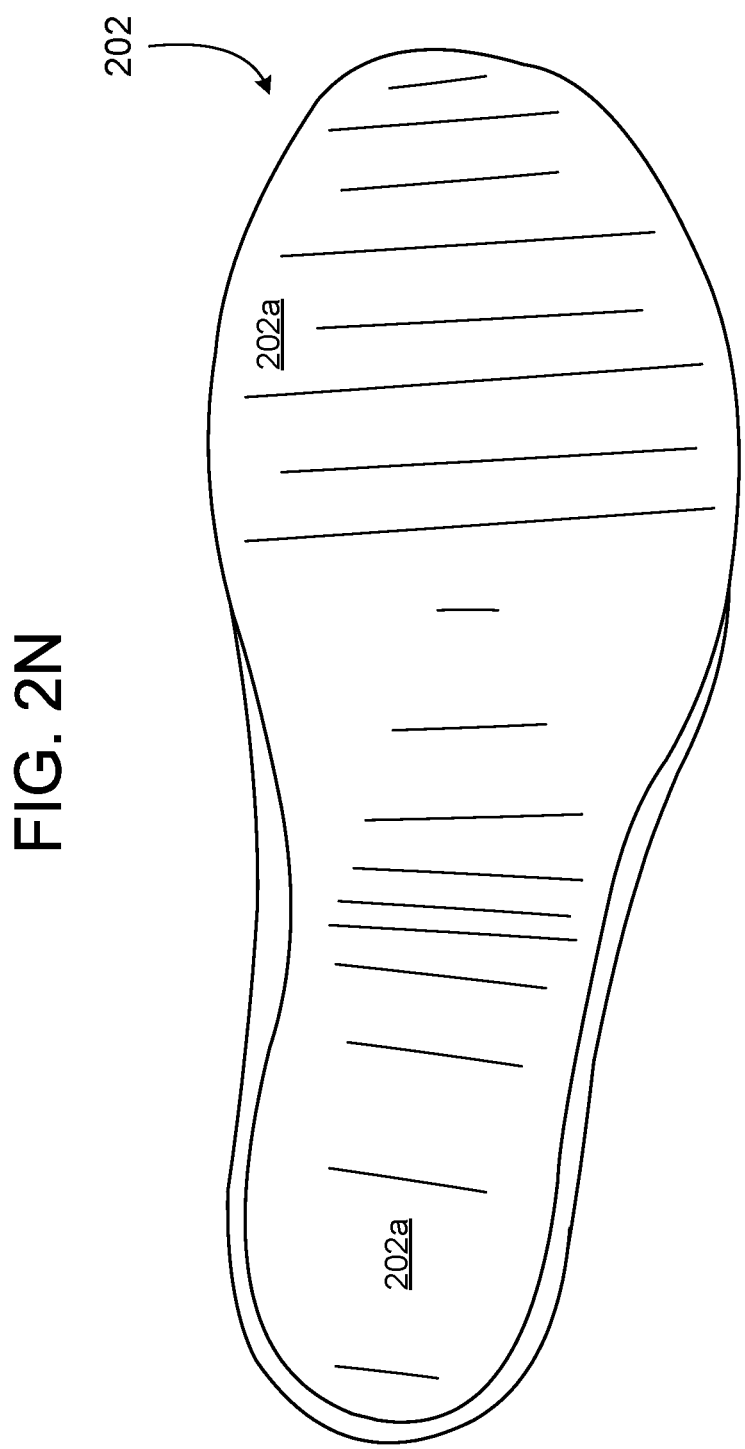

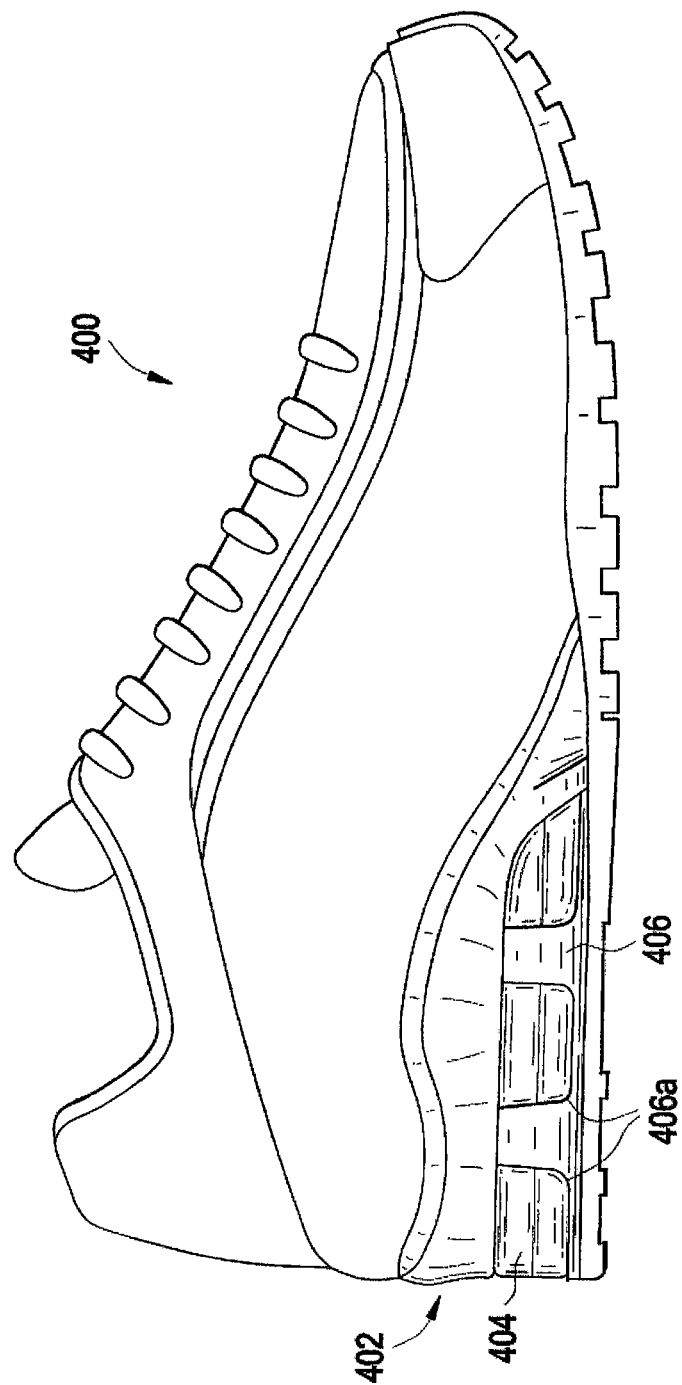

ARTICLE OF FOOTWEAR WITH AN INTERNAL AND EXTERNAL MIDSOLE STRUCTURE

FIELD OF THE INVENTION

The present invention relates to the field of footwear and other foot-receiving devices. More specifically, aspects of the present invention pertain to articles of footwear and other foot-receiving devices that include both interior and exterior midsole components. The major impact force attenuation and energy absorbing structures may be longitudinally offset in these midsole components (e.g., at least some of the major thickness or shock absorbing components of the exterior midsole component may be spaced longitudinally in a shoe from at least some of the major thickness or shock absorbing components of the interior midsole component).

BACKGROUND

Conventional articles of athletic footwear include two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and any contact surface. In addition to attenuating ground reaction forces and absorbing energy, the sole structure may provide traction and control potentially harmful foot motion, such as over pronation. The general features and configuration of the upper and the sole structure are discussed in greater detail below.

The upper forms a void on the interior of the footwear for receiving the foot. The void has the general shape of the foot, and access to the void is provided at an ankle opening. Accordingly, the upper extends over the instep and toe areas of the foot, along the medial and lateral sides of the foot, and around the heel area of the foot. A lacing system often is incorporated into the upper to selectively change the size of the ankle opening and to permit the wearer to modify certain dimensions of the upper, particularly girth, to accommodate feet with varying proportions. In addition, the upper may include a tongue that extends under the lacing system to enhance the comfort of the footwear (e.g., to modulate pressure applied to the foot by the laces), and the upper also may include a heel counter to limit or control movement of the heel.

Various materials may be utilized in manufacturing the upper. The upper of an article of athletic footwear, for example, may be formed from multiple material layers that may include, for example, an exterior layer, a middle layer, and an interior layer (and these layers may fully or partially overlap). The materials forming the exterior layer (or other layers) of the upper may be selected based upon the properties of wear-resistance, abrasion resistance, flexibility, stretchability, and air-permeability, for example. With regard to the exterior layer, the toe area and the heel area may be formed of leather, synthetic leather, or a rubber material to impart a relatively high degree of wear-resistance and abrasion resistance. Leather, synthetic leather, and rubber materials, however, may not exhibit the desired degree of flexibility and air-permeability for all areas of the upper. Accordingly, various other areas of the exterior layer of the upper may be formed from a synthetic textile. The exterior layer of the upper may be formed, therefore, from numerous material elements that each imparts different properties to specific areas of the upper.

A middle (or other) layer of the upper may be formed from a lightweight polymer foam material that improves overall comfort and protects the foot from objects that may contact the upper. Similarly, an interior layer of the upper may be formed of a moisture-wicking textile that removes perspiration from the area immediately surrounding the foot. In some articles of athletic footwear, the various layers may be joined with an adhesive, and stitching may be utilized to join elements within a single layer or to reinforce specific areas of the upper.

The sole structure generally incorporates multiple layers that are conventionally referred to as an insole, a midsole, and an outsole. The insole (which also may constitute a sock liner) is a thin member located within the upper and adjacent the plantar (lower) surface of the foot to enhance footwear comfort, e.g., to wick away moisture. The midsole, which is traditionally attached to the upper along the entire length of the upper, forms the middle layer of the sole structure and serves a variety of purposes that include controlling foot motions and attenuating impact forces. The outsole forms the ground-contacting element of footwear and is usually fashioned from a durable, wear-resistant material that includes texturing or other features to improve traction.

The primary element of a conventional midsole is a resilient, polymer foam material, such as polyurethane or ethylvinylacetate ("EVA"), that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness, degree of ground reaction force attenuation, and energy absorption properties may be altered to meet the specific demands of the activity for which the footwear is intended to be used.

In addition to polymer foam materials, conventional midsoles may include, for example, stability devices that resist over-pronation and moderators that distribute ground reaction forces. The use of polymer foam materials in athletic footwear midsoles, while providing protection against ground reaction forces, may introduce instability that contributes to a tendency for over-pronation. Although pronation is normal, it may be a potential source of foot and leg injury, particularly if it is excessive. Stability devices are often incorporated into the polymer foam material of midsoles to control the degree of pronation in the foot. Examples of stability devices are found in U.S. Pat. No. 4,255,877 to Bowerman; U.S. Pat. No. 4,287,675 to Norton et al.; U.S. Pat. No. 4,288,929 to Norton et al.; U.S. Pat. No. 4,354,318 to Frederick et al.; U.S. Pat. No. 4,364,188 to Turner et al.; U.S. Pat. No. 4,364,189 to Bates; and U.S. Pat. No. 5,247,742 to Kilgore et al. In addition to stability devices, conventional midsoles may include fluid-filled bladders, as disclosed in U.S. Pat. Nos. 4,183,156 and 4,219,945 to Rudy, for example.

SUMMARY OF THE INVENTION

This Summary is provided to introduce some concepts relating to this invention in a simplified form that are further described below in the Detailed Description. This Summary is not intended to identify key features or essential features of the invention.

While useful for any desired types or styles of shoes, aspects of this invention may be of particular interest for children's shoes (e.g., for infants, toddlers, pre-school aged children, elementary school aged children, and/or middle school aged children). Conventional children's shoes can be relatively stiff and firm, particularly in the forefoot area, because the foam or other midsole member (if any) typically is located outside the foot-receiving chamber. Thus, the child typically stands on a relatively thin sock liner or insole member that is located over a relatively stiff and hard lasting board. Because of the child's relatively light weight and limited mobility (at least for very young children), the external foam or other midsole member provides little comfort to the forefoot area of the foot. Moreover, the forefoot area is quite stiff due to its construction, particularly for small children that are just beginning to learn to walk.

Articles of footwear in accordance with at least some examples of this invention, however, include both interior and exterior midsole components. More specifically, at least some aspects of this invention relate to articles of footwear including a rearfoot region, a midfoot region, and a forefoot region, wherein the article of footwear comprises: (a) an upper that at least in part defines an interior chamber for receiving a foot; (b) an interior midsole component received within the interior chamber, wherein, at the forefoot region, the interior midsole component includes at least one longitudinal flexion line and at least one transverse flexion line; and (c) an exterior sole structure engaged with the upper. This exterior sole structure may include: (a) an exterior midsole component in the rearfoot region of the article of footwear, wherein the exterior midsole component need not extend under the forefoot region of the article of footwear and (b) an outsole component that extends under the forefoot region. The outsole component further may extend under the exterior midsole component in the rearfoot region.

The interior midsole component may include a base and a plurality of pod elements extending from the base at the forefoot region, wherein the pod elements are separated from one another by the various flexion lines. This interior midsole component is located within the foot-receiving chamber and provides a soft, comfortable surface in direct contact with the wearer's (e.g., a child's) foot. The flexion lines of the interior midsole component allow the wearer's foot to more easily flex in both the longitudinal and transverse directions.

Additional aspects of this invention relate to foot-receiving devices that include: (a) a foot-covering component (e.g., akin to the footwear upper) that at least in part defines an interior chamber for receiving a foot; (b) an interior midsole component received within the interior chamber, wherein, at the forefoot region, the interior midsole component includes at least one longitudinal flexion line and at least one transverse flexion line; and (c) a foot-supporting component (e.g., akin to the footwear exterior sole structure) engaged with the foot-covering component, wherein the foot-supporting component includes: (a) an exterior midsole component in the rearfoot region of the foot-receiving device, wherein the exterior midsole component need not extend under the forefoot region of the foot-receiving device and (b) a base support component (e.g., akin to the footwear outsole component) that extends under the forefoot region.

Still additional aspects of this invention relate to methods for making articles of footwear and other foot-receiving devices of the types described above. Such methods may include: (a) engaging an upper or foot-covering member of the types described above with an exterior sole structure or other base support component of the types described above, and (b) inserting an interior midsole component of the types described above into the interior chamber defined at least in part by the upper or foot-covering member.

BRIEF DESCRIPTION OF THE DRAWINGS

The foregoing Summary of the Invention, as well as the following Detailed Description of the Invention, will be better understood when read in conjunction with the accompanying drawings in which like reference numerals refer to similar elements in all of the various views in which that reference number appears.

FIGS. 2C through 2M illustrate various views of an interior midsole component that may be included in articles of footwear or other foot-receiving devices in accordance with at least some examples of this invention, and FIG. 2N illustrates a bottom view of an upper member that may be included in articles of footwear or other foot-receiving devices in accordance with at least some examples of this invention.

FIGS. 3 and 4 illustrate additional example footwear structures according to some examples of this invention.

DETAILED DESCRIPTION OF THE INVENTION

Figure 1:
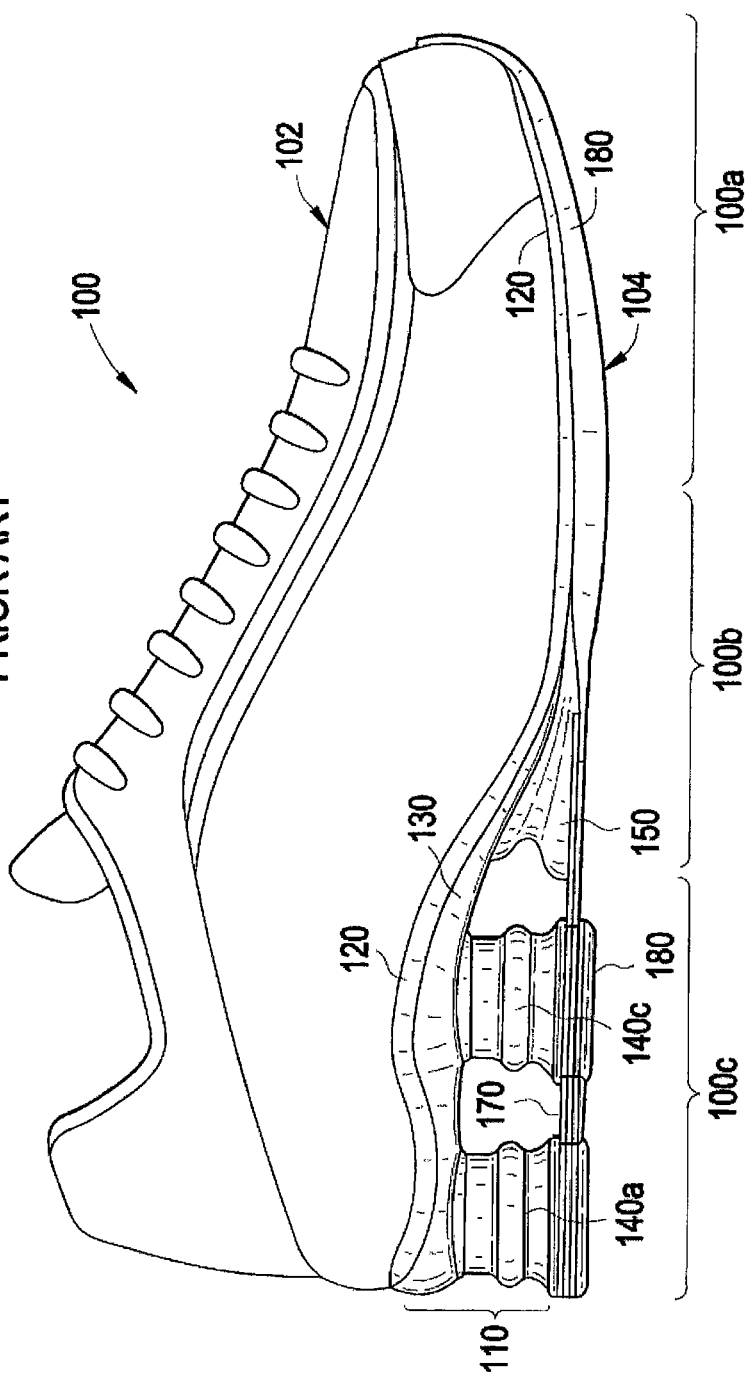
FIG. 1 is a lateral elevational view of a conventional article of footwear.

In the following description of various examples of footwear and foot-receiving device structures and components according to the present invention, reference is made to the accompanying drawings, which form a part hereof, and in which are shown by way of illustration various example structures and environments in which aspects of the invention may be practiced. It is to be understood that other structures and environments may be utilized and that structural and functional modifications may be made from the specifically described structures without departing from the scope of the present invention.

I. General Description of Aspects of This Invention

Aspects of this invention relate to articles of footwear or other foot-receiving devices that include both interior and exterior midsole components. The major impact force attenuation and energy absorbing structures may be longitudinally offset or spaced apart in these midsole components (e.g., at least some of the major thickness or shock absorbing features of the exterior midsole component (which may be located primarily in the rearfoot region) may be spaced longitudinally in the device from at least some of the major thickness or shock absorbing features of the interior midsole component (which may be located primarily in the forefoot region and/or midfoot regions)). As some more specific examples, at least some aspects of this invention relate to articles of footwear including a rearfoot region, a midfoot region, and a forefoot region, wherein the article of footwear comprises: (a) an upper that at least in part defines an interior chamber for receiving a foot; (b) an interior midsole component received within the interior chamber, wherein, at the forefoot region, the interior midsole component includes at least one longitudinal flexion line and at least one transverse flexion line; and (c) an exterior sole structure engaged with the upper. This exterior sole structure may include: (a) an exterior midsole component in the rearfoot region of the article of footwear, wherein the exterior midsole component need not extend under the forefoot region of the article of footwear and (b) an outsole component that extends under the forefoot region. The outsole component further may extend under the exterior midsole component in the rearfoot region.

As used in this specification, "longitudinal" flexion lines generally extend in a front-to-rear (or heel-to-toe) direction of the article of footwear, and the lines may be straight or curved. "Transverse" flexion lines generally extend in a side-to-side (or medial side-to-lateral side) direction of the article of footwear, and the lines may be straight or curved. Flexion lines may be formed in a variety of ways, and in some examples, they may constitute a reduced thickness of the component in which they are formed or a space between individual elements of a component (such as the spaces between pod elements as described in more detail below). The flexion lines may be molded into the component, cut into the component, and/or formed by fixing separated parts to a base member. Other ways of defining preferred lines of flex or bend or "flexion lines" in a footwear component (e.g., an interior midsole component, an outsole component, etc.) also may be used without departing from this invention.

The exterior midsole component may take on a variety of different specific constructions and have a variety of different specific properties without departing from this invention. In some examples, the exterior midsole component will include a plurality of support elements separated by spaces (e.g., two or more foam columns, cylinders, or the like). The support elements may extend from a common base region located adjacent the upper to or toward the outsole component. In other example constructions, the exterior midsole component may constitute a foam layer (e.g., synthetic polyurethane foams, rubber materials, ethylvinylacetate materials, etc.). In yet other example constructions, the exterior midsole component may include a fluid-filled bladder, optionally one that is fully or partially contained within a foam material (e.g., of the types mentioned above) or a cage element. The exterior midsole component also may include one or more mechanical shock absorbing or impact force attenuating members.

The interior midsole component also may take on a variety of different constructions and have a variety of different properties without departing from this invention. In some example constructions, the interior midsole component may include a base, a first pod element extending from the base, and a second pod element extending from the base, wherein the first and second pod elements are separated from one another by the longitudinal flexion line(s) and/or by the transverse flexion line(s). In some other examples, the interior midsole component includes a base and first, second, third, and fourth pod elements extending from the base arranged in a 2×2 matrix (e.g., wherein: (a) the first and second pod elements are separated from one another by a longitudinal flexion line, (b) the third and fourth pod elements are separated from one another by the same longitudinal flexion line, (c) the first and third pod elements are separated from one another by a transverse flexion line and (d) the second and fourth pod elements are separated from one another by the same transverse flexion line). In a similar manner, six pod elements may be arranged in a 2×3 matrix (with three rows each containing two pod elements extending side-to-side across the interior midsole component) or eight pod elements may be arranged in a 2×4 matrix (with four rows each containing two pod elements extending side-to-side across the interior midsole component). The row of pod elements located within or closest to the mid-foot region of the article of footwear may be spaced from a remaining portion of the interior midsole component by one or more transverse flexion lines. The remaining portion of the interior midsole component (e.g., the rearfoot region and at least some of the midfoot region) need not include any flexion lines (although such flexion lines may be present in some example structures).

If desired, the outsole component also may include one or more flexion lines (transverse or longitudinal), optionally in the forefoot region of the shoe, and optionally positioned so as to generally align with and/or function cooperatively with one or more of the flexion lines of the interior midsole component.

In at least some example constructions in accordance with this invention, the longitudinal flexion line of the interior midsole component will be located closer to a medial side of the interior midsole component than to a lateral side of the interior midsole component. In such structures, the joints associated with the wearer's big toe may operate to move or flex the big toe and the phalangeal and metatarsal bones associated with it in the longitudinal direction of the foot independent of other regions of the foot (e.g., other toes), which provides a more natural, barefoot walking feel and helps strengthen the wearer's feet. While it may, this longitudinal flexion line need not extend to the rearfoot and/or midfoot regions of the interior midsole component. Optionally, all or substantially all of the transverse flexion lines also may be located in the forefoot region of the interior midsole component (and optionally, none of the transverse flexion lines need to be located in the rearfoot region).

The interior midsole component in accordance with at least some examples of this invention may be somewhat thicker at the forefoot area than at the heel area. For example, the material thickness at the central forefoot region (e.g., through the foam material of one of the pod elements) may be 1.25 to 5 times thicker than the material thickness at a central heel location, and in some example structures, 1.4 to 4 times thicker or even 1.5 to 3.5 times thicker. In making these measurements, the central heel location is located: (a) forward from the rear heel location a distance of 25% of the overall longitudinal length L of the interior midsole component and (b) at a midpoint between the medial side edge and the longitudinal side edge of the interior midsole component at the 25% longitudinal length location. Also, in making these measurements, thickness of the central forefoot location is measured at a forefoot location corresponding to: (a) forward from the rear heel location a distance of 68% of the overall longitudinal length L of the interior midsole component and (b) at a midpoint between the medial side edge and the longitudinal side edge of the interior midsole component at the 68% longitudinal length location. Should either of the central heel or forefoot locations fall within a flexion line of the interior midsole component, the measurement location is moved: (a) forward 0.5 cm and (b) toward the lateral side 0.5 cm for as many times as is necessary until the measurement location falls outside all flexion lines. In more absolute terms, in accordance with at least some examples of this invention, the interior midsole component may be from 1.5 to 6 mm thick at the central heel location and from 1.9 to 14 mm thick at the central forefoot location.

Any suitable or desired materials may be used for the various footwear components without departing from this invention. As noted above, the exterior midsole component may be formed, at least in part, of a foam material, and if desired, the interior midsole component also may be made, at least in part, from a foam material (e.g., of the various types described above). As some more specific examples, when the interior midsole component includes one or more pod elements as described above, the pod element(s) may be made from a resilient foam material, and if desired, the pod elements may be made from a foam material that is softer and/or less dense than the foam material of the exterior midsole component. Also, if desired, a top surface of the interior midsole component (e.g., the surface that will be located closest to the wearer's foot in the final footwear construction) may include a fabric element that optionally will contact the wearer when the shoe is worn. This fabric element may function similar to an insole member or sock liner (e.g., to help wick away moisture, etc.). The fabric element may be attached to an upper surface of the interior midsole component, e.g., by adhesives, stitching, or the like. Alternatively, if desired, a separate insole or sock liner may be provided in the footwear interior chamber independent of the interior midsole component.

Additional aspects of this invention relate to making articles of footwear of the types described above (and described in more detail below). Such methods may include, for example: (a) engaging an upper of the various types or constructions described above with an exterior sole structure of the various types or constructions described above to thereby form a base footwear member including an interior foot-receiving chamber and (b) inserting an interior midsole component of the various types or constructions described above into the interior foot-receiving chamber.

In addition to articles of footwear, aspects of this invention can be practiced with other types of "foot-receiving devices" (i.e., any device into which a user places at least some portion of his or her foot). In addition to all types of footwear or shoes, foot-receiving devices include, but are not limited to: boots, bindings and other devices for securing feet in snow skis, cross country skis, water skis, snowboards, and the like; boots, bindings, clips, or other devices for securing feet in pedals for use with bicycles, exercise equipment, and the like; boots, bindings, clips, or other devices for receiving feet during play of video games or other games; and the like. Such foot-receiving devices may include: (a) a foot-covering component (akin to the footwear upper) that at least in part defines an interior chamber for receiving a foot; (b) an interior midsole component received within the interior chamber, wherein, at the forefoot region, the interior midsole component includes at least one longitudinal flexion line and at least one transverse flexion line; and (c) a foot-supporting component (akin to the footwear exterior sole structure) engaged with the foot-covering component, wherein the foot-supporting component includes: (i) an exterior midsole component in the rearfoot region of the foot-receiving device, wherein the exterior midsole component need not extend under the forefoot region of the foot-receiving device and (ii) a base support component (akin to the footwear outsole component) that extends under the forefoot region.

Given the general description of features, aspects, structures, and arrangements according to the invention provided above, a more detailed description of specific example articles of footwear and/or other foot-receiving devices in accordance with this invention follows.

II. Detailed Description of Example Articles of Footwear or Other Foot-Receiving Devices According to This Invention Referring to the figures and following discussion, various articles of footwear and features thereof in accordance with the present invention are disclosed. The footwear depicted and discussed are athletic shoes, and the concepts disclosed with respect to this footwear may be applied to a wide range of athletic footwear styles, including, but not limited to: walking shoes, tennis shoes, soccer shoes, football shoes, basketball shoes, running shoes, and cross-training shoes. In addition, the concepts of the present invention may be applied to a wide range of non-athletic footwear, including work boots, sandals, loafers, and dress shoes. Moreover, while aspects of this invention may be used on any size shoes, at least some aspects of this invention may have particular usefulness and relevance in footwear for children and those just learning to walk, including footwear in the infant, baby, toddler, pre-school, and youth sizes (e.g., U.S. sizes 0 to 13.5 (children) and U.S. sizes 1 to 6 (youth)). Accordingly, the present invention is not limited to the precise embodiments disclosed herein, but applies to footwear and foot-receiving devices generally.

As some initial background, attention first is invited to FIG. 1, which shows various features of a conventional article of footwear 100. This example article of footwear 100 includes an upper 102 that is connected to a sole structure 104. Upper 102 may be made of conventional materials and conventional constructions that are known and used in the art (e.g., foam materials, synthetic textiles, and leather that are stitched or adhesively bonded to each other to form a comfortable structure for receiving a foot). Sole structure 104 may include an insole (not shown), which may be a thin member generally located within upper 101 and at a position that corresponds with the sole of the foot, thereby enhancing the comfort of footwear 100. Sole structure 104 also may include a midsole 110 that forms the primary impact-force absorption layer of footwear 100 and serves, therefore, to attenuate ground reaction forces and absorb energy when footwear 100 is compressed against the ground or other contact surface. The primary components of midsole 110 in this example are a foam layer 120, a top plate 130, support elements 140a and 140c, a midfoot wedge 150, and a bottom plate 170. In addition, sole structure 104 may include an outsole 180 that forms the primary ground-contacting surface of footwear 100. The outsole 180 may be fashioned from a wear-resistant material, such as carbon black rubber compounds, and it may include texturing or other features to enhance traction.

During running or other activities that compress sole structure 104 between the foot and the ground, footwear 100 attenuates ground reaction forces and absorbs energy that otherwise would be transferred to the leg and foot of the wearer. The degree of impact force attenuation provided by footwear 100 is generally related to the overall stiffness of sole structure 104. In general, a greater stiffness provides a harder feel to the wearer, whereas lesser stiffness corresponds with a softer feel.

In this specification, various elements of articles of footwear and other foot-receiving devices will be discussed in detail. To aid in the following discussion, footwear may be divided into three general regions: a forefoot region 100a that generally corresponds with a front portion of the foot, including the toes; a midfoot region 100b that generally corresponds with a middle portion of the foot that includes the arch; and a heel or rearfoot region 100c that generally corresponds with the heel. Forefoot region 100a may be considered to encompass a ball region and a toe region of the footwear (wherein the ball region generally extends under the ball of the foot and the toe region generally extends under the toes of the foot). Regions 100a-100c are not intended to demarcate precise areas of an article of footwear. Instead, regions 100a-100c are intended to define general areas that aid in the following discussion. Additionally, although regions 100a-100c above are generally described with respect to an overall article of footwear, references to these same general regions 100a-100c also may apply to any part or individual component of an article of footwear, such as the upper, an insole or sock liner, a midsole, an outsole, an overall sole structure, etc.

Figure 2A:
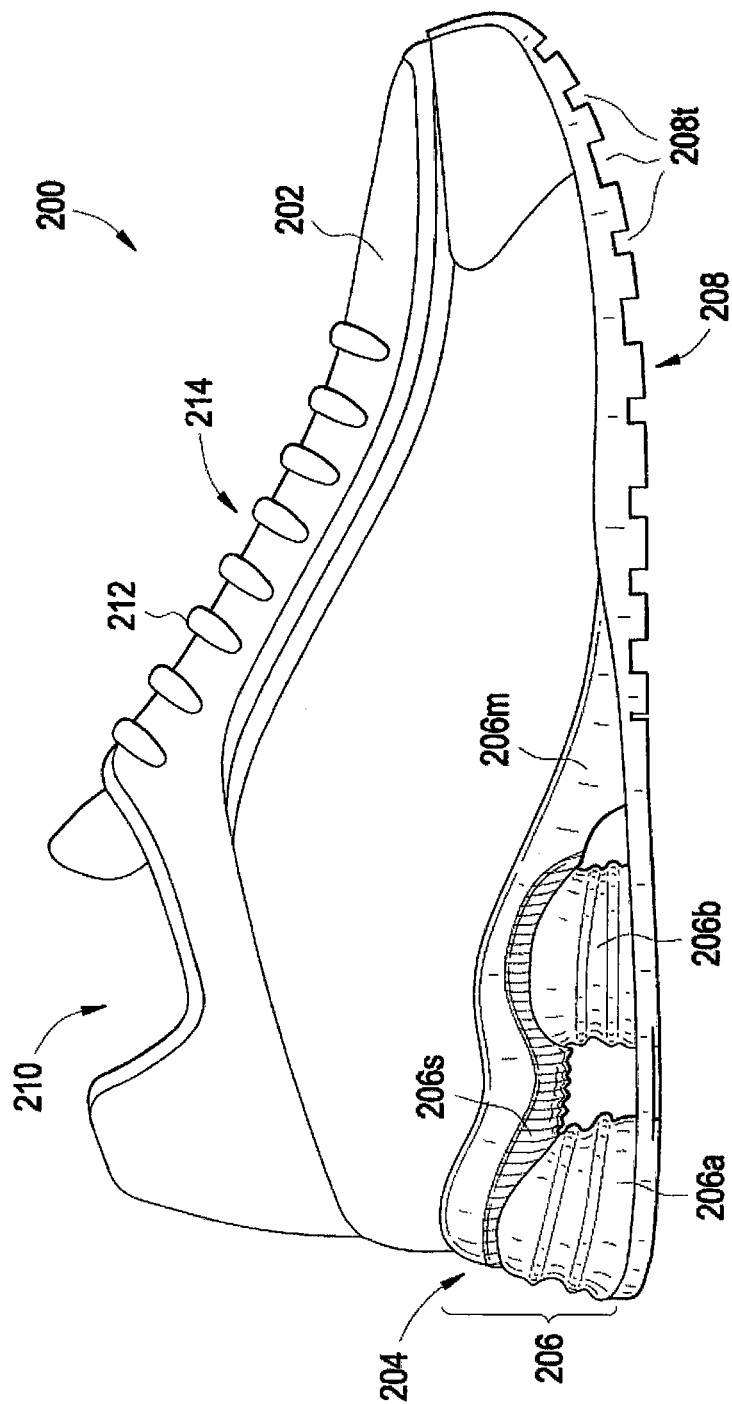
FIGS. 2A and 2B illustrate an article of footwear according to some examples of this invention.
Figure 2B:
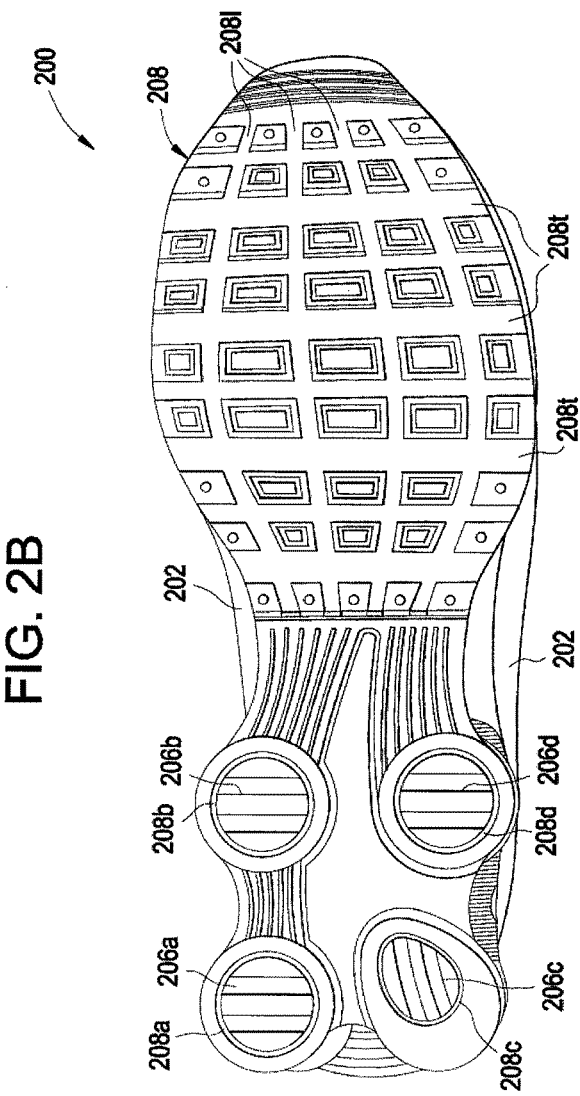
Figure 2D:
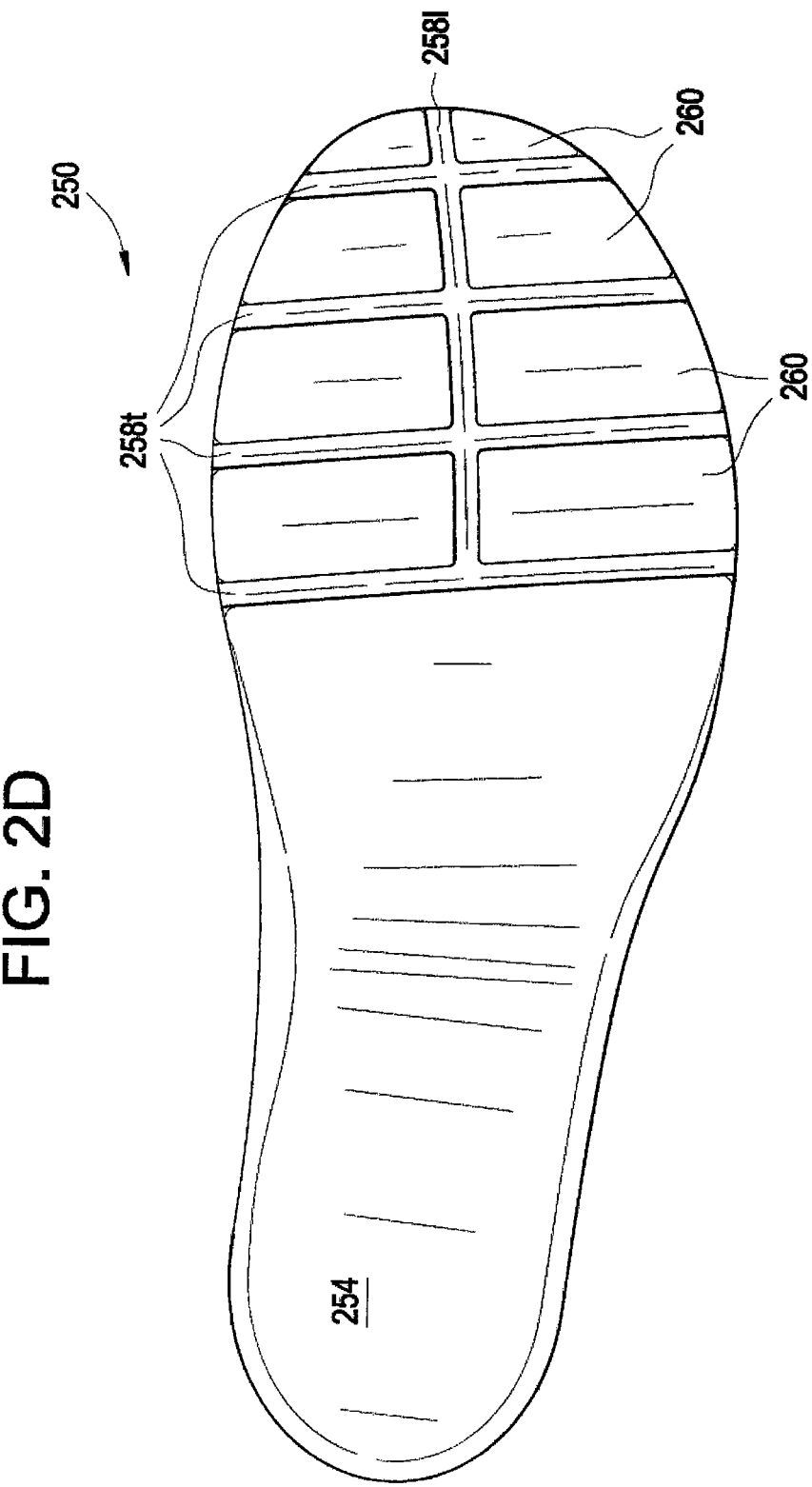

FIGS. 2A through 2N show various views of an article of footwear 200 or various components thereof in accordance with at least some examples of this invention. More specifically, FIGS. 2A and 2B show a medial side view and a bottom view, respectively, of this example article of footwear 200, and FIGS. 2C through 2F show top, bottom, medial side, and lateral side views, respectively, of an example interior midsole component 250 that may be included in this example article of footwear. FIGS. 2H through 2M provide cross-sectional views of the interior midsole component 250 at locations shown by the section lines in FIG. 2G, and FIG. 2N illustrates a bottom view of upper member 200.

As shown in FIG. 2A, this example article of footwear 200 includes an upper member 202 and a sole structure 204. The upper member 202 and the sole structure 204 may be engaged with one another in any suitable or desired manner without departing from this invention, including in conventional manners as are well known and used in the art, such as via adhesives or cements, sewing or stitching, mechanical connectors, etc.

The upper member 202 may be made from any desired material(s) and/or construction(s) without departing from this invention, including conventional materials and constructions as are known and used in the footwear art. As some more specific examples, the upper member 202 may be made from one or more parts including fabric pieces, textile pieces, leathers, polymers, and the like. The various materials may be natural or synthetic, and appropriate materials may be provided at various locations in the upper member 202 to control various properties of the upper member 202, such as its color, style, aesthetic design, stiffness, flexibility, support, breathability, abrasion resistance, wear resistance, or the like.

The upper member 200 defines an opening 210 in the ankle area (over the heel region) that provides access to an interior foot chamber for receiving a wearer's foot during use. As shown in FIG. 2N, the upper member 202 may be closed off (e.g., with a strobel sock, strobel board, lasting board, or other bottom member 202a; by extension of the lateral and medial side materials of the upper member 202 around the bottom; etc.) so that the upper member 202 itself defines an entire interior foot-receiving chamber. Alternatively, if desired, the upper member 202 may have an open bottom or a partially open bottom (not shown in FIG. 2N) such that it partially defines the interior foot chamber and such that a top of the sole member 204 or other component defines a portion of the interior foot-receiving chamber. The interior foot-receiving chamber defined by this upper member 202 may be somewhat larger than conventional foot-receiving chambers of conventional shoes to accommodate the interior midsole component to be described in more detail below.

The size of the ankle opening 210 may be selectively controlled, at least in part, through a footwear securing mechanism, such as the laces 212 provided in the vamp or instep area 214 of the shoe 200. While laces 212 are shown, any other desired type of securing mechanism may be used without departing from this invention, including straps, buckles, zippers, hook-and-loop fasteners, and the like, including securing mechanisms and securing systems as are conventionally known and used in the art.

Aspects of footwear structure 200 differ from the article of footwear 100 shown in FIG. 1 at least in part with respect to the sole structure 204. As described above and shown in FIG. 1, conventional footwear 100 includes a midsole component 110 that is exterior to the foot-receiving chamber of the upper 102. This midsole component 110 includes an exterior foam layer 120, top plate 130, support elements 140a and 140c (plus two more support elements on the opposite side (not shown)), a midfoot wedge 150, and a bottom plate 170. Notably, the exterior foam layer 120 extends the entire longitudinal length of the article of footwear 100, including throughout the heel region 100c, midfoot region 100b, and forefoot region 110a.

The sole structure 204 shown in FIG. 2A also includes an exterior midsole component 206 and an outsole component 208 (each of which may be made from one or more individual parts). The exterior midsole component 206 of this example structure includes four support members 206a through 206d that extend from an upper support base 206s. An upper surface of the upper support base 206s forms a surface for engaging and attaching to a bottom surface of the upper member 202, at least at the heel region (and optionally in at least some portion of the midfoot region). The support members 206a through 206d may be separate from and attached to the upper support base 206s (e.g., by adhesives or cements, by mechanical connectors, etc.), or they may be integrally formed with the upper support base 206s as a unitary one piece construction (e.g., formed by molding, rapid prototyping technology, etc.). Any desired number of support members may be provided in a footwear construction without departing from this invention.

In the illustrated construction, the upper support base 206s, the support members 206a through 206d, and the midfoot wedge part 206m are made as a single piece construction by a molding technique from a foam material, such as polyurethane foam or ethylvinylacetate foam materials. As other options, the upper support base 206s may be made from a stiffer material and form a harder base plate, e.g., including a polymeric base plate made from PEBAX® (a thermoplastic polyester elastomer manufactured by Elf Atochem) or other relatively hard or stiff plastic material. Additionally, if desired, a bottom base plate may be provided (akin to base plate 170 of FIG. 1), e.g., at least in the heel region under the support members 206a through 206d. Notably, as shown in FIG. 2A, the exterior midsole component 206 of this example structure does not extend to the forefoot portion (at least not under the toe portion) of the article of footwear 200 and does not extend under the forefoot portion (at least not under the toe portion) of the upper 202.

The outsole component 208 of this example footwear structure 200 covers substantially the entire bottom of the shoe (at least 90% of the bottom surface) and extends throughout the forefoot, midfoot, and heel regions. If desired, the outsole component 208 may cover the entire bottom surface of the shoe. Also, if desired, the outsole component 208 may be made from multiple pieces, and distinct gaps may be provided between the pieces. For example, the outsole component 208 may include one or more pieces in the forefoot and rearfoot regions while a gap in the outsole component is present in the midfoot region. While not required, if desired, as shown in FIG. 2B, the heel region of the outsole component may include some openings (208a-208d) through which a bottom of the support members 206a through 206d (or a bottom plate, if present) may be exposed.

As further shown in FIGS. 2A and 2B, at least the forefoot region (and possibly at least some of the midfoot region) of the outsole 208 may include some flexion lines formed therein. In the illustrated example, the outsole 208 may include one or more longitudinal flexion lines 208*l* and one or more transverse flexion lines 208*t*. These flexion lines 208*l* and 208*t* constitute thinned areas of the outsole member 208 that help define predetermined locations where the outsole 208 will bend or flex during a step cycle. The thinned areas or flexion lines 208*l* and 208*t* can be integrally formed in the outsole structure 208 and the outsole material, e.g., during a molding process to form the outsole 208. Additionally or alternatively, if desired, the outsole material 208 may be cut, perforated, stiffened, reinforced, or otherwise treated at various specific locations so as to induce flexion at the desired locations of the outsole 208.

If desired, the positions and orientations of at least some of the flexion lines 208*l* and 208*t* may be selected to complement the natural motion of the foot, e.g., during a walking or running step cycle. In general, the motion of the foot during walking or running proceeds as follows: (a) initially, the heel strikes the ground, followed by the ball of the foot, (b) as the heel leaves the ground, the foot rolls forward so that the toes make contact, and (c) finally the entire foot leaves the ground to begin another cycle. During the time that the foot is in contact with the ground, the foot typically rolls from the outside or lateral side to the inside or medial side, a process called "pronation." That is, normally, the outside (lateral side) of the heel strikes the ground first and the toes on the inside (medial side) of the foot leave the ground last. The location(s) and/or depth(s) of at least some of the flexion lines 208*l* and 208*t* may help promote a neutral foot-strike position and complement the neutral forward and lateral roll of the foot as it is in contact with the ground. The longitudinal flexion line(s) 208*l* provide lateral flexibility to permit the foot to pronate naturally during the running or walking step cycle.

When one or more longitudinal outsole flexion lines 208*l* are present, preferably at least one longitudinal flexion line 208*l* will extend in an area generally between the big toe and the second toe, e.g., to allow a bend or flex of the foot in the longitudinal direction between the big toe and the next toe (and the other toes). When one or more transverse outsole flexion lines 208*t* are present, preferably at least one transverse flexion line 208*t* will extend in an area along the toe joints and/or along the metatarsophalangeal joints, e.g., to allow the various front-to-rear sections of the foot to bend or flex somewhat independent of the other sections. These features help develop foot strength and provide a natural, barefoot and proper step feel, particularly for children that are just beginning to learn to walk.

FIGS. 2C through 2M illustrate another component included in footwear structures in accordance with examples of this invention, like footwear structure 200. More specifically, FIGS. 2C through 2M illustrate an interior midsole component 250 that may be received within the interior foot-receiving chamber of the shoe 200. As shown in these figures (and particularly FIGS. 2C through 2F), interior midsole component 250 includes a top surface 252 that supports the foot during use and a bottom surface 254. The interior midsole component 250 may be constructed from an impact force attenuating material to provide a soft and comfortable foot-support surface, such as polyurethane foam or ethylvinylacetate foam materials. The interior midsole component 250 may be made from one or more independent pieces, and the piece(s) may be formed in any desired manner without departing from the invention, including through the use of injection molding or blow molding processes. As shown in these figures, the interior midsole component 250 may cover or substantially cover the bottom of the entire foot-receiving chamber of the article of footwear 200 and thus fully support the wearer's foot when placed in the article of footwear 200. Also, the interior midsole component 250 may be releasably and removably received in the shoe's interior chamber, or it may be fixed within the interior chamber, e.g., fixed to the bottom surface of the upper 202 or to a top surface of the exterior sole structure 204, using adhesives or cements, mechanical connectors, sewing or stitching, etc.

Because it is contained within the footwear's interior chamber (and thus substantially protected from exterior elements and forces), the material of the interior midsole component 250 may be somewhat more fragile, softer, and/or less dense than materials of any foam component making up the exterior midsole component (e.g., elements 206, 206*a*-206*d*, 206*s*, 206*m*, etc.). For example, at least some of the interior midsole component 250 may be made from a foam material having a density of less than 0.25 g/cm$^3$, as described, for example, in U.S. Pat. No. 7,941,938, which patent is entirely incorporated herein by reference.

As some more specific examples and as described in U.S. Pat. No. 7,941,938 mentioned above, in at least some structures in accordance with this invention, all, substantially all, or at least some portion of the interior midsole component 250 may include a foam material comprising a reaction product of about 10 to about 100 parts per hundred hydrogenated or non-hydrogenated acrylonitrile butadiene copolymer, 0 to about 40 parts per hundred modified hydrogenated acrylonitrile butadiene copolymer, and 0 to about 90 parts per hundred alpha olefin copolymer, and at least one additive in an amount suitable to form the foam material. This foam material may have a lightweight, spongy feel. The density of the foam material may be generally less than 0.25 g/cm$^3$, less than 0.20 g/cm$^3$, less than 18 g/cm$^3$, less than 0.15 g/cm$^3$, less than 0.12 g/cm$^3$, and in one aspect, about 0.10 g/cm$^3$. As an example range, the foam density may fall within the range, for example, of 0.05 to 0.25 g/cm$^3$.

Also, in accordance with at least some examples of this invention, the resiliency of the foam material for the interior midsole component 250 may be greater than 40%, greater than 45%, at least 50%, and in one aspect from 50-70%. Compression set may be 60% or less, 50% or less, 45% or less, and in some instances, within the range of 20 to 60%. The hardness (Durometer Asker C) of the foam material may be, for example, 25 to 50, 25 to 45, 25 to 35, 35 to 45, e.g., depending on the type of footwear. The tensile strength of the foam material may be at least 15 kg/cm$^2$, and typically 15 to 40. The elongation % is 150 to 500, typically above 250. The tear strength is 6-15 kg/cm, typically above 7. In at least some example constructions according to the invention, the foam material of at least some portion of the interior midsole component 250 may have lower energy loss and may be more lightweight than traditional EVA foams. The energy loss may be less than 30%, and optionally within the range of about 20% to about 30%. As additional examples, if desired, at least some portion of the interior midsole component 250 may be made from foam materials used in the LUNAR family of footwear products available from NIKE, Inc. of Beaverton, Oreg.

While the above paragraphs describe potential properties and features of foam materials for interior midsole components in accordance with some examples of this invention, those skilled in the art will recognize that the interior midsole component may have other desired properties or features without departing from this invention.

Figure 2E:
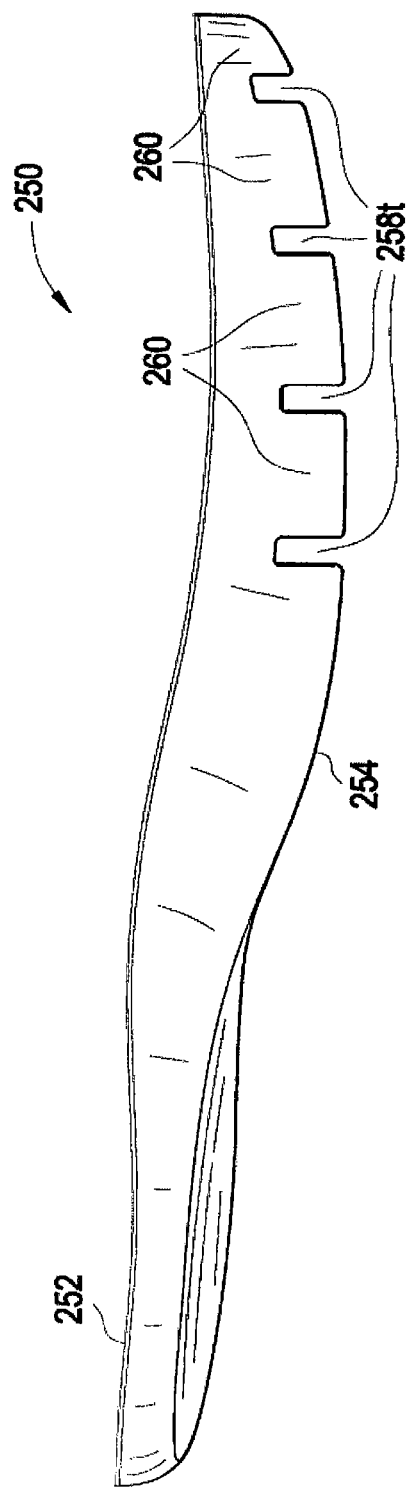
Figure 2G:
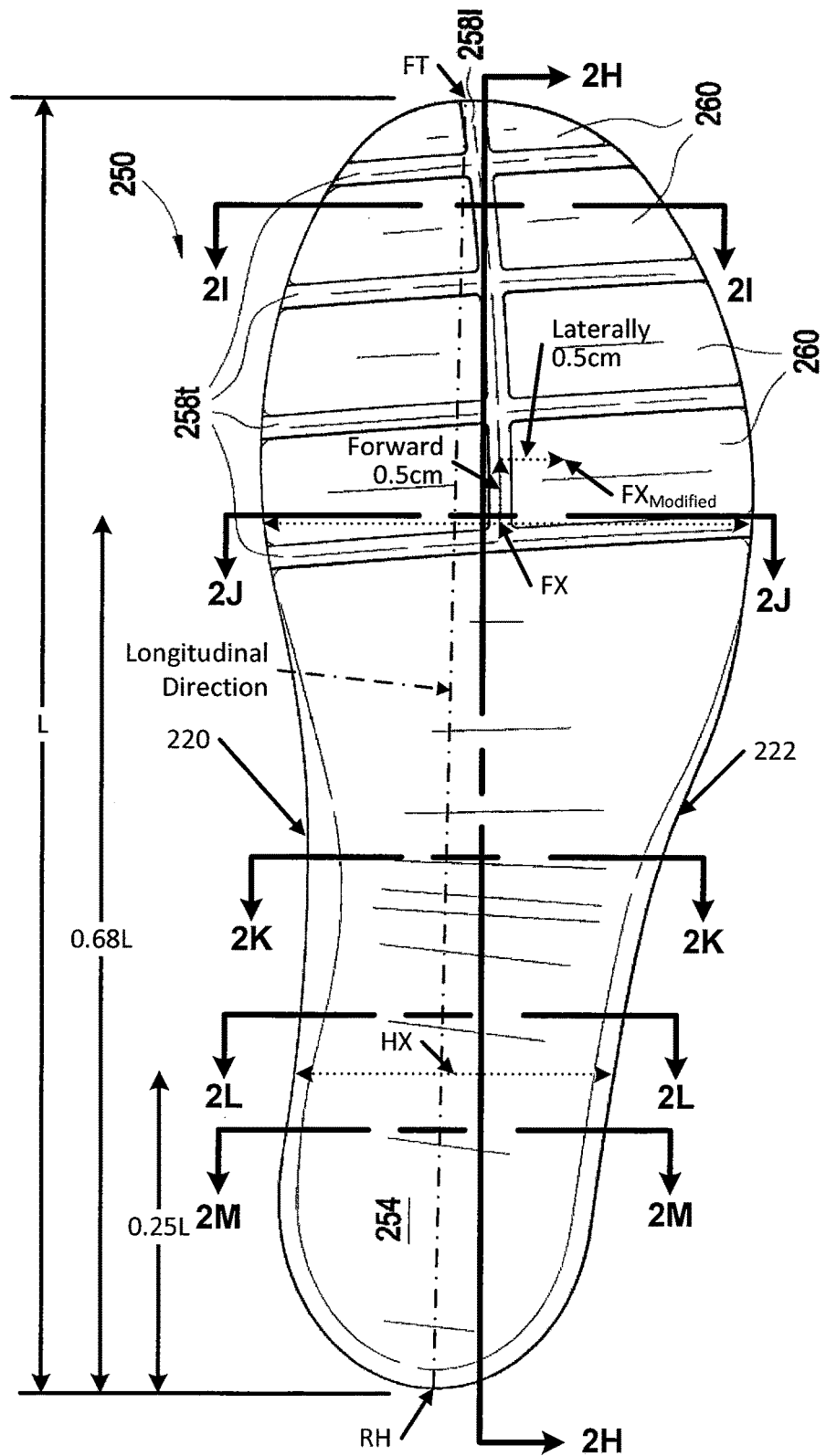

FIGS. 2E and 2F show the profile (medial and lateral sides) of this example interior midsole component 250. As shown by these figures, in the heel region, the interior midsole component 250 of this example is relatively thin, and may be thinner than the forefoot region and/or midfoot region. Notably, in this example footwear sample 200, the heel area of the shoe (which typically absorbs the initial impact force of a step cycle, as mentioned above) includes the exterior midsole component 206, and that exterior midsole component 206 primarily absorbs the impact forces and energy (with perhaps some minor contributions from the interior midsole component 250). In the midfoot region, the interior midsole component 250 is relatively thick as compared to the heel region. Either or both of the exterior midsole component 206 (e.g., midsole wedge, if any) and the interior midsole component 250 may absorb the impact forces and energy in the midfoot region. In the forefoot region, the interior midsole component 250 thickness varies. The interior midsole component 250 is the primary impact force and energy absorbing component in the forefoot region of this example article of footwear 200.

FIGS. 2D through 2F show additional features that may be present in interior midsole components 250 of articles of footwear 200 in accordance with at least some examples of this invention. As shown in these figures, the forefoot region of this example interior midsole component 250 includes a longitudinal flexion line 258*l* and a plurality of transverse flexion lines 258*t*. While specific numbers and arrangements of flexion lines 258*l* and 258*t* are shown in FIGS. 2D through 2F, any desired number of flexion lines in any desired arrangements may be included in an interior midsole component 250 without departing from this invention. In some examples of this invention, the flexion lines 258*l* and 258*t* will be provided only in the forefoot region of the interior midsole component 250 or only in the forefoot and midfoot regions of the interior midsole component 250 (and not in the rearfoot region). The flexion lines 258*l* and 258*t* divide the midsole component 250 into a plurality of pod elements 260 that are separated by the flexion lines 258*l* and 258*t*, e.g., as shown in FIGS. 2D through 2F.

In the specific illustrated example of FIGS. 2D through 2F, the flexion lines 258*l* and 258*t* constitute thinned areas of the interior midsole component 250 that help define predetermined locations where the interior midsole component 250 will preferentially bend or flex during a step cycle. The thinned areas or flexion lines 258*l* and 258*t* can be integrally formed in the interior midsole component 250, e.g., during a molding process to form it. Optionally, if desired, the interior midsole component 250 material may be cut, perforated, stiffened, reinforced, or otherwise treated at various specific locations so as to induce flexion at the desired locations. In at least some example structures according to this invention, at least some portion of some of the flexion lines 258*l* and 258*t* will extend through at least 30% of the thickness of the material of the interior midsole component 250 at the location surrounding the flexion line, and in some examples, at least some areas of the flexion lines will extend through at least 40% or at least 50% of the interior midsole thickness at the surrounding location(s).

If desired, the positions and orientations of at least some of the flexion lines 258*l* and 258*t* may be selected to complement the natural motion of the foot, e.g., during a walking or running step cycle. As noted above, the motion of the foot during walking or running typically proceeds as follows: (a) initially, the heel strikes the ground, followed by the ball of the foot, (b) as the heel leaves the ground, the foot rolls forward so that the toes make contact, and (c) finally the entire foot leaves the ground to begin another cycle. During the time that the foot is in contact with the ground, the foot typically pronates (i.e., rolls from the outside or lateral side to the inside or medial side). The location(s) and/or depth(s) of at least some of the flexion lines 258*l* and 258*t* may promote a neutral foot-strike position and complement the neutral forward roll of the foot as it is in contact with the ground. The longitudinal flexion line(s) 258*l* may provide lateral flexibility to permit the foot to pronate naturally during the running or walking step cycle.

When one or more longitudinal interior midsole flexion lines 258*l* are present, preferably at least one longitudinal flexion line 258*l* will extend in an area generally between the big toe and the second toe, e.g., to allow a bend or flex of the foot in the longitudinal direction between the big toe and the next toe (and the other toes). When one or more transverse interior midsole flexion lines 258*t* are present, preferably at least one transverse flexion line 258*t* will extend in an area along the toe joints and/or along the metatarsophalangeal joints, e.g., to allow the various front-to-rear sections of the foot to bend or flex somewhat independent of the other sections. These features also help develop foot strength and provide a natural, barefoot and proper step feel, particularly for children that are just beginning to learn to walk.

Optionally, in at least some example constructions according to the invention, the interior midsole flexion lines 258*l* and 258*t* may align with and/or otherwise be positioned with respect to the outsole flexion lines 208*l* and 208*t* so as cooperate to provide a natural, barefoot and proper step feel and/or to help develop foot strength.

As shown in the example of FIGS. 2C, 2E, and 2F, the top surface 252 of the interior midsole component 250 may be covered with a thin fabric or textile layer (or other material), e.g., akin to a conventional footbed material of an article of footwear (e.g., the top layer or material of a conventional insole or a sock liner). The fabric or textile layer, when present, may be connected to the top surface 252 in any desired manner, such as via adhesives or cements, via sewing or stitching, via mechanical connectors, etc. The top surface 252 of the interior midsole component 250 may be curved or contoured, e.g., in a conventional manner, to better conform to the shape of a foot.

FIG. 2G is a bottom view of the interior midsole component 250 similar to the view of FIG. 2D, but FIG. 2G further includes section lines 2H-2H through 2M-2M. Sectional views corresponding to these section lines 2H-2H through 2M-2M are shown in FIGS. 2H through 2M, respectively. In addition to showing the contoured top surface 252, these views help illustrate, as noted above, that this example interior midsole component 250 is somewhat thicker at the forefoot area than at the heel area. As some general examples, the material thickness at the forefoot region (e.g., the thickness of the foam material through one of the pod elements 260) may be 1.25 to 5 times thicker than the material thickness at a central heel location, and for some structures, 1.4 to 4 times thicker or even 1.5 to 3.5 times thicker.

FIGS. 2G and 2H provide information to assist one in determining where thickness measurements in accordance with this aspect of the invention may be made. For the central heel location measurement, in accordance with this aspect of the invention, the central heel location is located: (a) forward, in a longitudinal direction, from the rearmost heel RH location a distance of 25% of the overall longitudinal length L of the interior midsole component 250 and (b) at a midpoint HX along a line perpendicular to the longitudinal direction and directly connecting the medial side edge 220 and the longitudinal side edge 222 of the interior midsole component 250 at the 25% longitudinal length location. For the central forefoot location measurement, in accordance with this aspect of the invention, the central forefoot location is located: (a) forward, in the longitudinal direction, from the rearmost heel RH location a distance of 68% of the overall longitudinal length L of the interior midsole component 250 and (b) at a midpoint FX along a line perpendicular to the longitudinal direction and directly connecting the medial side edge 220 and the longitudinal side edge 222 of the interior midsole component 250 at the 68% longitudinal length location. The longitudinal direction is determined by a line connecting the rearmost heel point RH and the forward most toe point FT of the interior midsole component 250 (shown by the dash-dot line in FIG. 2G). If the forward most and/or rearmost locations of a specific interior midsole component constitute line segments, then the forward most toe point and/or the rearmost heel point constitute the mid-point of the corresponding line segment. If the forward most and/or rearmost locations of a specific interior midsole component constitute two or more separated points, then the forward most toe point and/or the rearmost heel point constitute the mid-point of a line segment connecting the separated points.

Should either of the central heel HX or central forefoot FX locations fall within a flexion line (e.g., 258*l* or 258*t*) of the interior midsole component 250, the thickness measurement location is moved: (a) forward in the longitudinal direction 0.5 cm and (b) toward the lateral side perpendicular to the longitudinal direction 0.5 cm for as many times as is necessary until the measurement location falls outside all flexion lines. This is shown in FIG. 2G by the arrows in the forefoot region moving from location FX to location $FX_{modified}$ (necessary because the central forefoot location FX of this example falls within longitudinal flexion line 258*l*).

While various possible material thickness ranges for the central heel and central forefoot locations of the midsole component 250 are described above, in the structure shown in FIGS. 2G and 2H, the thickness of the foam material at location RX is about 3.5 mm and the thickness of the foam material at location $FX_{modified}$ is 10.5 mm, e.g., suitable for shoes in a size range of child size 10 to youth size 3. For smaller sizes (e.g., child sizes 5 to 10), the thickness of the foam material at location RX may be about 3.5 mm and the thickness of the foam material at location $FX_{modified}$ may be about 5.5 mm. The sizes of the interior chambers of the footwear uppers may be increased somewhat (as compared to conventional uppers) to accommodate this greater thickness of the forefoot portion of the midsole component 250.

Figure 3:
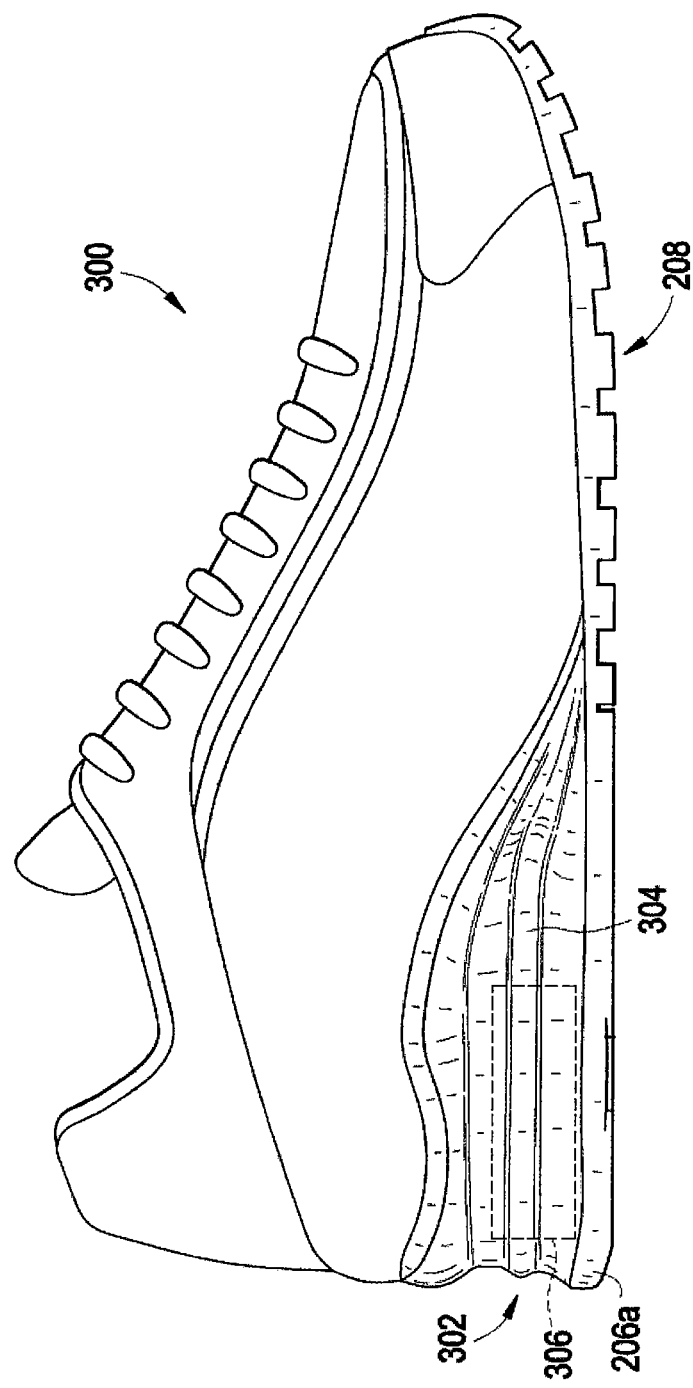

Other variations in the footwear construction are possible without departing from this invention. For example, the exterior midsole component need not constitute a plurality of support elements (e.g., elements 206*a* through 206*d* as shown in FIG. 2A). As a more specific example, as shown in FIG. 3, the exterior midsole component 302 of this example footwear structure 300 includes a foam material layer 304 (e.g., made of conventional midsole foam material, such as polyurethane foams, ethylvinylacetate foams, etc.). This exterior midsole component 302 may terminate in the longitudinal direction in the heel region and/or in the midfoot region of the article of footwear 300, as shown in FIG. 3 (and before it reaches the forefoot region). Optionally, as shown in broken lines in FIG. 3, some portion of this exterior midsole foam layer 304 may contain one or more fluid-filled bladders 306, as are conventionally known and used in footwear midsole constructions. Optionally, some portion(s) of the fluid-filled bladder(s) 306 may be exposed and visible from the exterior of the shoe, e.g., through one or more openings provided in the side of the foam material layer 304. Such articles of footwear 300 may be used with outsole components 208 and/or interior midsole components 250 within the footwear interior chamber of the types described above in conjunction with FIGS. 2A through 2M, e.g., including flexion lines 258*t* and 258*l* in the interior midsole component 250.

As yet another potential option, the exterior midsole component may constitute one or more fluid-filled bladders that are engaged with a footwear structure in some manner other than by at least partially containing them in a foam layer. For example, as shown in FIG. 4, this example footwear structure 400 includes an exterior midsole component 402 in which a fluid-filled bladder 404 is contained within a cage element 406. The cage element 406 may be made from any resilient, durable structure that contains the bladder and provides structural support to the bladder to reduce the likelihood of bladder failure. As a result, the cage element 406 may take on many shapes and configurations and may be made of numerous types of materials, depending on the application. With respect to preferred material properties, general criteria include mechanical strength, fatigue resistance, stiffness, abrasion resistance, and wear resistance. Suitable materials include, but are not limited to, engineering or performance polymers, such as HYTREL® 5526, which is a thermoplastic polyester elastomer manufactured by DuPont, and PEBAX® 5533, which is a thermoplastic polyester elastomer manufactured by Elf Atochem. One of skill in the art will recognize that, in addition to the above materials, other materials exhibiting similar properties may be used to manufacture the cage element 406 of this aspect of the present invention. As shown in FIG. 4, the cage element 406 may include one or more openings 406*a* through which the fluid-filled bladder 404 is exposed at the exterior of the footwear structure 400. While this is not a requirement, the presence of these windows 406*a* does help lighten the article of footwear, enables control of the overall flexibility of the exterior midsole element 402, and enables production of aesthetically interesting patterns and designs.

This example exterior midsole component 402 may terminate in the longitudinal direction in the heel region and/or in the midfoot region of the article of footwear 400, as shown in FIG. 4 (and before it reaches the forefoot region). Such articles of footwear 400 may be used with outsole components 208 and/or interior midsole components 250 within the footwear interior chamber of the types described above in conjunction with FIGS. 2A through 2M, e.g., including flexion lines 258*t* and 258*l* in the interior midsole component 250.

As still additional examples, if desired, the exterior midsole component in the heel area of an article of footwear (or other foot-receiving device) may constitute a more mechanical type shock absorbing device, like those illustrated, for example, in U.S. Pat. Nos. 7,314,125; 7,458,172; 7,730,635; and 7,757,410, each of which is entirely incorporated herein by reference. Exterior midsole components of these types also may terminate in the longitudinal direction in the heel region and/or in the midfoot region of the article of footwear (and before they reach the forefoot region). Such articles of footwear (or other foot-receiving devices) may be used with outsole components 208 and/or interior midsole components 250 within the interior chamber of the types described above in conjunction with FIGS. 2A through 2M, e.g., including flexion lines 258*t* and 258*l* in the interior midsole component 250.

Finally, as noted above, in addition to articles of footwear, interior midsole components and/or exterior midsole components of the types described above can be used with other types of foot-receiving devices (i.e., any device into which a user places at least some portion of his or her foot). In addition to all types of footwear or shoes, such foot-receiving devices include, but are not limited to: boots, bindings and other devices for securing feet in snow skis, cross country skis, water skis, snowboards, and the like; boots, bindings, clips, or other devices for securing feet in pedals for use with bicycles, exercise equipment, and the like; boots, bindings, clips, or other devices for receiving feet during play of video games or other games; and the like.

III. Conclusion

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

What is claimed is:

1. An article of footwear including a rearfoot region, a midfoot region, and a forefoot region, wherein the article of footwear comprises:
    an upper including a bottom portion that completely closes a bottom of the upper such that the upper defines an entire interior chamber for receiving a foot;
    an interior midsole component including a foam material received within the interior chamber, wherein, at the forefoot region, the interior midsole component includes a longitudinal flexion line and a transverse flexion line in the foam material, wherein the interior midsole component includes a base, a first pod element extending from the base, a second pod element extending from the base, a third pod element extending from the base, and a fourth pod element extending from the base, and wherein: (a) the first and second pod elements are separated from one another by the longitudinal flexion line, (b) the third and fourth pod elements are separated from one another by the longitudinal flexion line, (c) the first and third pod elements are separated from one another by the transverse flexion line, and (d) the second and fourth pod elements are separated from one another by the transverse flexion line; and
    an exterior sole structure engaged with the upper, wherein the exterior sole structure consists essentially of: (a) an exterior midsole component made from one or more parts and located in the rearfoot region of the article of footwear, wherein the exterior midsole component includes a resilient foam material, and wherein the exterior midsole component terminates in a longitudinal direction of the article of footwear before reaching the forefoot region of the article of footwear and (b) an outsole component made from one or more parts that extends at least under the forefoot region and the rearfoot region, wherein the exterior midsole component includes a plurality of support elements extending from a common base region located adjacent the upper toward the outsole component.

2. An article of footwear according to claim 1, wherein, outside the flexion lines, the interior midsole component is thicker at a central forefoot location than at a central heel location.

3. An article of footwear according to claim 1, wherein the resilient foam material is a polyurethane foam material or an ethylvinylacetate foam material.

4. An article of footwear according to claim 1, wherein the exterior midsole component includes a fluid-filled bladder.

5. An article of footwear according to claim 1, wherein the article of footwear has a size within a range of U.S. children's sizes 0 to 13.5.

6. An article of footwear according to claim 1, wherein the interior midsole component further includes a fabric element that forms a surface of the interior midsole component opposite the longitudinal and transverse flexion lines.

7. An article of footwear according to claim 5, wherein the interior midsole component further includes a fabric element covering a surface of the base located opposite a surface of the base that includes the flexion lines.

8. An article of footwear according to claim 1, wherein, at the forefoot region, the outsole component includes an outsole longitudinal flexion line and a plurality of outsole transverse flexion lines that are different from the longitudinal flexion line and the transverse flexion line of the interior midsole component.

9. An article of footwear according to claim 1, wherein the longitudinal flexion line is located closer to a medial side of the interior midsole component than to a lateral side of the interior midsole component.

10. An article of footwear according to claim 1, wherein the longitudinal flexion line does not extend to the rearfoot region of the interior midsole component.

11. An article of footwear according to claim 1, wherein the longitudinal flexion line is the only longitudinal flexion line located in the forefoot region of the interior midsole component.

12. An article of footwear according to claim 1, wherein the foam material of the interior midsole component is softer or less dense than the resilient foam material of the exterior midsole component.

13. An article of footwear according to claim 1, wherein, at the forefoot region, the outsole component includes an outsole longitudinal flexion line that is different from the longitudinal flexion line of the interior midsole component, and wherein the outsole longitudinal flexion line is aligned with the longitudinal flexion line of the interior midsole component.

14. An article of footwear according to claim 1, wherein, at the forefoot region, the interior midsole component includes plural transverse flexion lines including said transverse flexion line, wherein, at the forefoot region, the outsole component includes plural outsole transverse flexion lines that are different from the plural transverse flexion lines of the interior midsole component, and wherein the plural outsole transverse flexion lines are aligned with the plural transverse flexion lines of the interior midsole component.

15. An article of footwear according to claim 1, wherein, at the forefoot region, the interior midsole component includes plural transverse flexion lines including said transverse flexion line, wherein, at the forefoot region, the outsole component includes an outsole longitudinal flexion line and plural outsole transverse flexion lines that are different from the longitudinal flexion line and the plural transverse flexion lines of the interior midsole component, wherein the outsole longitudinal flexion line is aligned with the longitudinal flexion line of the interior midsole component, and wherein the plural outsole transverse flexion lines are aligned with the plural transverse flexion lines of the interior midsole component.

16. A foot-receiving device including a rearfoot region, a midfoot region, and a forefoot region, wherein the foot-receiving device comprises:

a foot-covering component including a bottom portion that completely closes a bottom of the foot-covering component such that the foot-covering component defines an entire interior chamber for receiving a foot;

an interior midsole component including a foam material received within the interior chamber, wherein, at the forefoot region, the interior midsole component includes a longitudinal flexion line and a transverse flexion line in the foam material, wherein the interior midsole component includes a base, a first pod element extending from the base, a second pod element extending from the base, a third pod element extending from the base, and a fourth pod element extending from the base, and wherein: (a) the first and second pod elements are separated from one another by the longitudinal flexion line, (b) the third and fourth pod elements are separated from one another by the longitudinal flexion line, (c) the first and third pod elements are separated from one another by the transverse flexion line, and (d) the second and fourth pod elements are separated from one another by the transverse flexion line; and a foot-supporting component engaged with the foot-covering component, wherein the foot-supporting component consists essentially of: (a) an exterior midsole component made from one or more parts and located in the rearfoot region of the foot-receiving device, wherein the exterior midsole component includes a resilient foam material, and wherein the exterior midsole component terminates in a longitudinal direction of the foot-receiving device before reaching the forefoot region of the foot-receiving device and (b) a base support component made from one or more parts that extends at least under the forefoot region and the rearfoot region, wherein the exterior midsole component includes a plurality of support elements extending from a common base region located adjacent the foot-covering component toward the base support component.

\* \* \* \* \*

UNITED STATES PATENT AND TRADEMARK OFFICE
CERTIFICATE OF CORRECTION

PATENT NO. : 9,661,893 B2
APPLICATION NO. : 13/304151
DATED : May 30, 2017
INVENTOR(S) : Stegmaier et al.

Page 1 of 2

It is certified that error appears in the above-identified patent and that said Letters Patent is hereby corrected as shown below:

In the Claims

Column 17, Claim 2, Line 64:
Delete "An" and insert --The-- therefor

Column 18, Claim 3, Line 1:
Delete "An" and insert --The-- therefor

Column 18, Claim 4, Line 4:
Delete "An" and insert --The-- therefor

Column 18, Claim 5, Line 6:
Delete "An" and insert --The-- therefor

Column 18, Claim 6, Line 9:
Delete "An" and insert --The-- therefor

Column 18, Claim 7, Line 13:
Delete "An" and insert --The-- therefor

Column 18, Claim 8, Line 18:
Delete "An" and insert --The-- therefor

Column 18, Claim 9, Line 24:
Delete "An" and insert --The-- therefor

Column 18, Claim 10, Line 28:
Delete "An" and insert --The-- therefor

Signed and Sealed this
Twenty-eighth Day of January, 2025

Coke Morgan Stewart
*Acting Director of the United States Patent and Trademark Office*

CERTIFICATE OF CORRECTION (continued)
U.S. Pat. No. 9,661,893 B2

Column 18, Claim 11, Line 31:
Delete "An" and insert --The-- therefor

Column 18, Claim 12, Line 35:
Delete "An" and insert --The-- therefor

Column 18, Claim 13, Line 39:
Delete "An" and insert --The-- therefor

Column 18, Claim 14, Line 46:
Delete "An" and insert --The-- therefor

Column 18, Claim 15, Line 55:
Delete "An" and insert --The-- therefor